(12) United States Patent
Meyer et al.

(10) Patent No.: US 7,094,079 B2
(45) Date of Patent: Aug. 22, 2006

(54) ANGULAR POSITION MEASURING DEVICE

(75) Inventors: Hermann Meyer, Schneizlreuth (DE); Alfred Schmid, Stein a.d. Traun (DE); Johann Tauber, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/057,920

(22) Filed: Feb. 14, 2005

(65) Prior Publication Data

US 2005/0181649 A1 Aug. 18, 2005

(30) Foreign Application Priority Data

Feb. 13, 2004 (DE) .................. 10 2004 007 445

(51) Int. Cl.
*H01R 13/44* (2006.01)
(52) U.S. Cl. ....................................... 439/135
(58) Field of Classification Search ............... 439/135, 439/144; 242/107.1, 25; 250/231; 73/116
See application file for complete search history.

(56) References Cited

U.S. PATENT DOCUMENTS 4,512,184 A 4/1985 Ernst et al.
6,257,907 B1 * 7/2001 Feichtinger ............... 439/135
6,617,571 B1 9/2003 Thaler et al.

FOREIGN PATENT DOCUMENTS

| DE | 199 13 262 | 9/2000 |
|----|------------|--------|
| DE | 296 24 207 U | 3/2001 |
| EP | 0 828 319 | 3/1998 |
| EP | 1 167 916 | 1/2002 |

* cited by examiner

*Primary Examiner*—Alexander Gilman
(74) *Attorney, Agent, or Firm*—Kenyon & Kenyon LLP (57) ABSTRACT

An angular position measuring device includes a cap, a connecting cable and a spring element which is arranged on the cap. To fix the connecting cable in position, the spring element is able to generate a force which has a radial directional component with respect to the connecting cable, the connecting cable being pressed against the cap by this force. In this manner, the connecting cable is secured with form locking and/or frictional engagement on the cap in a contact area of the cap.

15 Claims, 7 Drawing Sheets

ANGULAR POSITION MEASURING DEVICE

CROSS-REFERENCE TO RELATED APPLICATIONS

The present application claims priority to application No. 10 2004 007 445.3, filed in the Federal Republic of Germany on Feb. 13, 2004, which is expressly incorporated herein in its entirety by reference thereto.

FIELD OF THE INVENTION

The present invention relates to an angular position measuring device.

BACKGROUND INFORMATION

Angular position measuring devices, also referred to as rotary transducers, are used for measuring rotary motions of a rotationally mounted member, particularly a shaft, over one or more revolutions. In so doing, the rotary motion is recorded incrementally or absolutely. In conjunction with gear racks and toothed wheels or with threaded spindles, linear motions may also be measured by an angular position measuring device.

An operating voltage is supplied to the angular position measuring device, and the measuring signals are tapped and relayed to a sequential electronics via connecting cables. To that end, in conventional angular position measuring devices, an opening is provided on a cap of the angular position measuring device, through which the connecting cable of the angular position measuring device can be conveyed and contacted there with a suitable electrical terminal unit.

European Published Patent Application No. 1 167 916 describes an angular position measuring device which has a device for relieving the connecting cable of strain. The strain relief and fixation of the connecting cable in position is achieved by closing a cover.

German Published Patent Application No. 199 13 262 describes an angular position measuring device having a cup-shaped, hollow-cylindrical cap. Prior to producing a plug-in connection, the connecting cable of the angular position measuring device is fixed in position with the aid of a holder in a manner that relieves strain, a fixation region of the connecting cable being clamped.

German Published Utility Model No. 296 24 207 describes an angular position measuring device in which the strain-relief part for the connecting cable is an integral component of the housing. The connecting cable is already mechanically secured prior to producing a plug-in connection between the connecting cable and the measuring electronics of the angular position measuring device.

Conventional angular position measuring devices have the disadvantage that they are comparatively difficult to assemble. This may be true when a strain-relief device is only effective after producing the plug-in connection between the connecting cable and the measuring electronics of the angular position measuring device. Moreover, conventional angular position measuring devices, e.g., those which are able to be assembled with less troublesome assembly effort, are equipped with strain-relief devices that may be comparatively costly to produce.

SUMMARY

An example embodiment of the present invention may provide an angular position measuring device that may permit quick, simple and reliable assembly, and the angular position measuring device may have a sturdy type of construction.

Accordingly, to fix the connecting cable in position, already during assembly a spring element generates a force which presses the connecting cable against the cap. In this manner, the connecting cable is secured with frictional engagement and/or form locking to the cap in a contact area of the cap. Therefore, the connecting cable is securely fixed in position, for example, for further assembly of the angular position measuring device.

In an example embodiment, after a cover has been mounted, the connecting cable, which has a fixation region—a crimp sleeve or crimp barrel, for example—is pressed against the cap not only by the spring element, but also by the cover.

The spring element may be made of a bent steel sheet, e.g., spring-steel sheet. This may provide a spring element of high elasticity. The caps may be produced using a casting method, so that aluminum alloys or plastics, for example, are considered as materials for this purpose. However, these materials already plastically deform in response to comparatively small tensions or stresses, so that the material of the spring element may be different from the material of the cap.

The great elastic deformability of the spring element may permit reliable fixation of the connecting cable during assembly, even if the outside diameter of the connecting cable is subject to marked dimensional tolerances, for example, in the region of the crimp sleeve. The pressure force, conditional on the spring qualities may always be sufficiently great and may always be below the maximum permissible load for the crimp sleeve or the cap, for example. Connecting cables produced comparatively inexpensively and having great dimensional tolerances in their fixation regions may therefore be used in the angular position measuring device as described herein.

According to an example embodiment of the present invention, an angular position measurement device includes: a cap; a connection cable; and a spring element arranged on the cap. The spring element is configured to generate a force having a radial directional component with respect to the connection cable to press the connection cable against the cap to fix the connection cable in position and to secure the connection cable with at least one of (a) form locking and (b) frictional engagement on the cap in a contact area of the cap.

The cap may include an opening, and the connection cable may be arranged through the opening. In a closed position of the cover, the cover may be arranged to cover the opening and the contact area with respect to surroundings.

In the closed position of the cover, the cover may be arranged to generate a force to press the connection cable against the cap to relieve strain.

The connection cable may include a fixation region, and the spring element and the cover may be configured to generate the forces to produce the at least one of (a) the form locking and (b) the frictional engagement connection of the fixation region to the contact area of the cap.

The spring element may be formed of a bent steel sheet, e.g., a bent spring-steel sheet.

The spring element may include a one-piece construction.

The spring element may include retention claws.

The spring element may be fastened to the cap by a clamp connection.

The cap may be plastically deformed in a region of the clamp connection to fasten the spring element to the cap.

According to an example embodiment of the present invention, an angular position measurement device includes: cap means; connecting cable means; and spring means arranged on the cap means. The spring means is for generating a force having a radial directional component with respect to the connecting cable means for pressing the connecting cable means against the cap means for fixing the connecting cable means in position and for securing the connecting cable means with at least one of (a) form locking and (b) frictional engagement on the cap means in a contact area of the cap means.

Other features and aspects hereof are described in the following description of exemplary embodiments with reference to the appended Figures.

DETAILED DESCRIPTION

Figure 1:
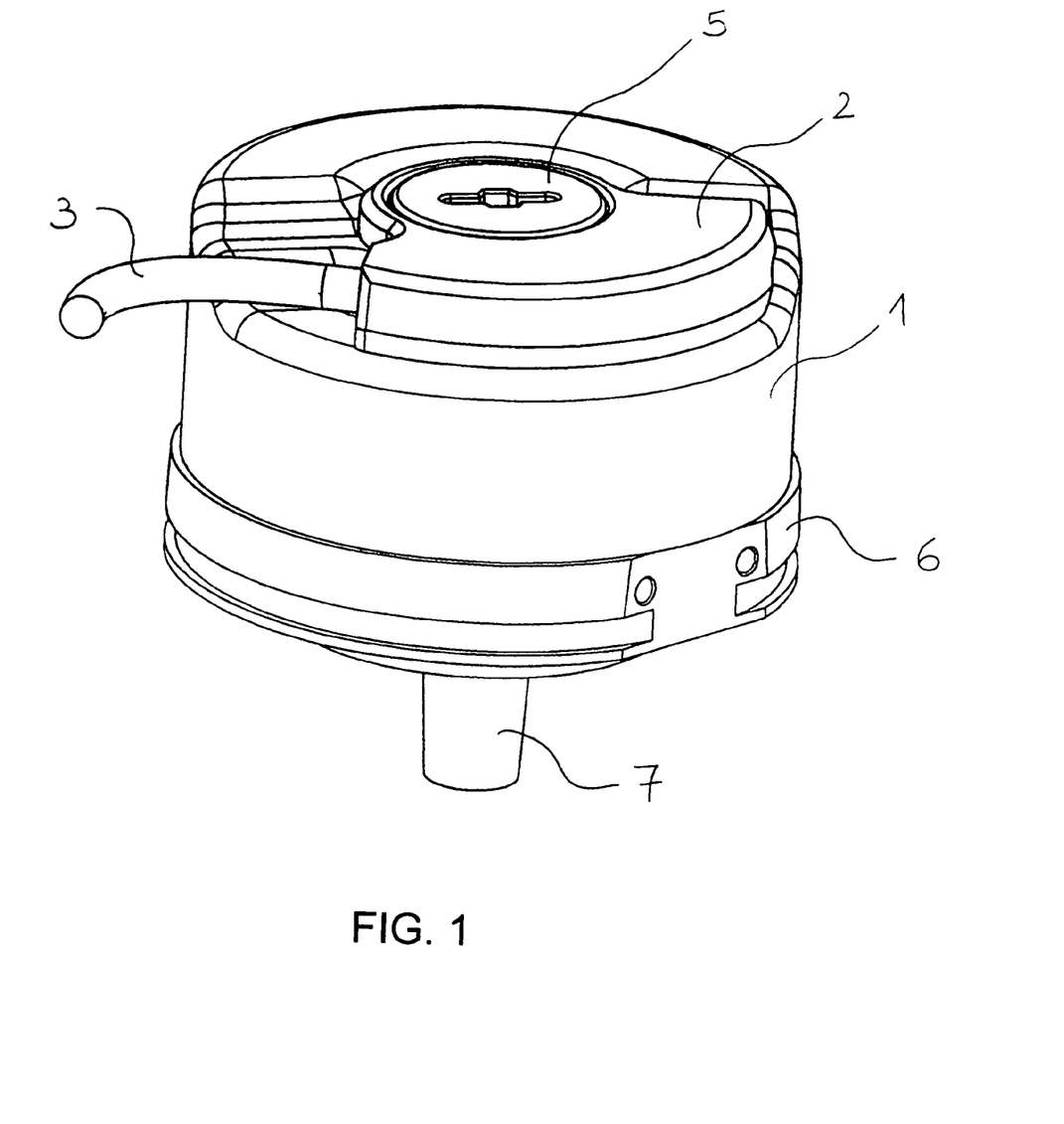
FIG. 1 is a perspective view of an angular position measuring device.

The angular position measuring device illustrated in FIG. 1 has a shaft 7 for connection to a member to be measured. The connection between shaft 7 and the member to be measured is implemented, for example, by a connection device in the form of a fixing screw projecting through shaft 7.

The angular position measuring device itself is secured to a further member via a base member 6. The member to be measured is, for example, a motor shaft, and the further member is a stationary motor housing. Angular position measuring devices designed for these applications are also referred to as rotary transducers.

Shaft 7 may be rotationally mounted in a conventional manner in base member 6, a code disk situated in the interior of the angular position measuring device being secured to shaft 7, and/or shaft 7 driving one or more code disks via a gear unit. In the example illustrated, the code disk is photoelectrically scanned by a scanner. Suitable photosensitive detectors are disposed on a printed-circuit board, on which, inter alia, electrical components are arranged for signal forming—e.g., amplification and digitalization—of the scanning signals supplied by the detectors. In addition to these measuring electronics, an electrical terminal of a plug-in connection, a socket in the exemplary embodiment described, is also located on the printed-circuit board. The mating terminal, e.g., a plug, of this plug-in connection situated in the interior of the angular position measuring device is attached to a connecting cable 3 extending to the outside. Connecting cable 3 is shielded for reliable signal transmission.

To protect the angular position measuring device and its measuring electronics, a cup-shaped cap 1 is provided which is secured to base member 6 by clamping over the periphery. In the example illustrated, this connection is a press-fit connection.

The angular position measuring device also has a cover 2 which is secured to cap 1 by a screw 5.

Figure 2A:
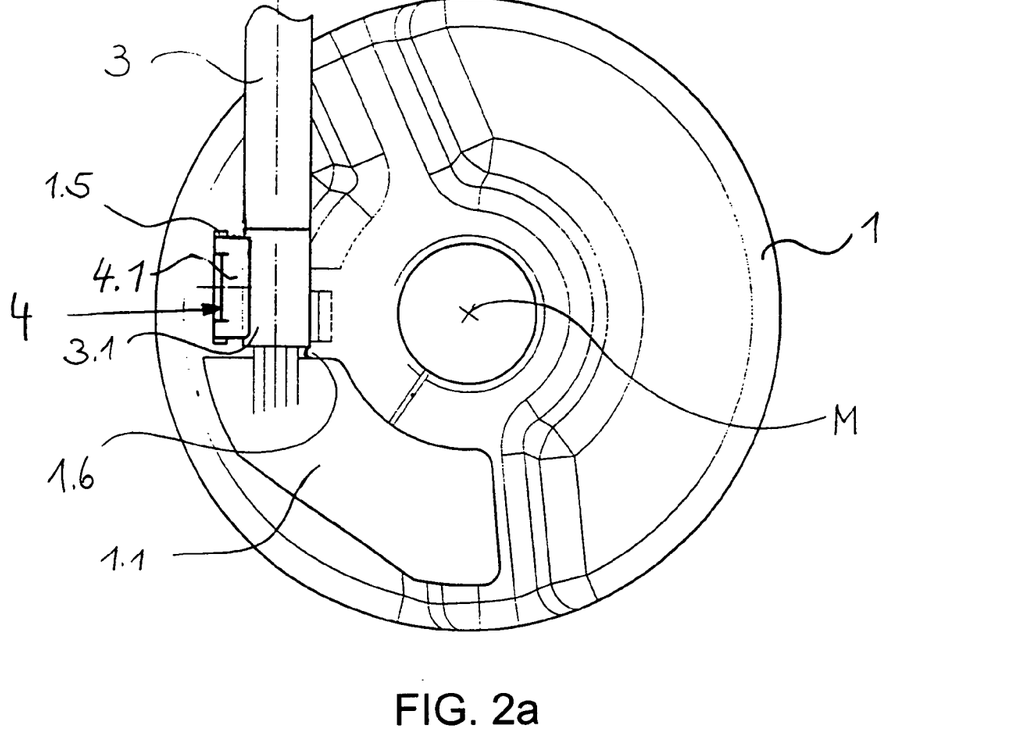
FIG. 2a is a top view of the cap without the opened cover, according to an exemplary embodiment.
Figure 2B:
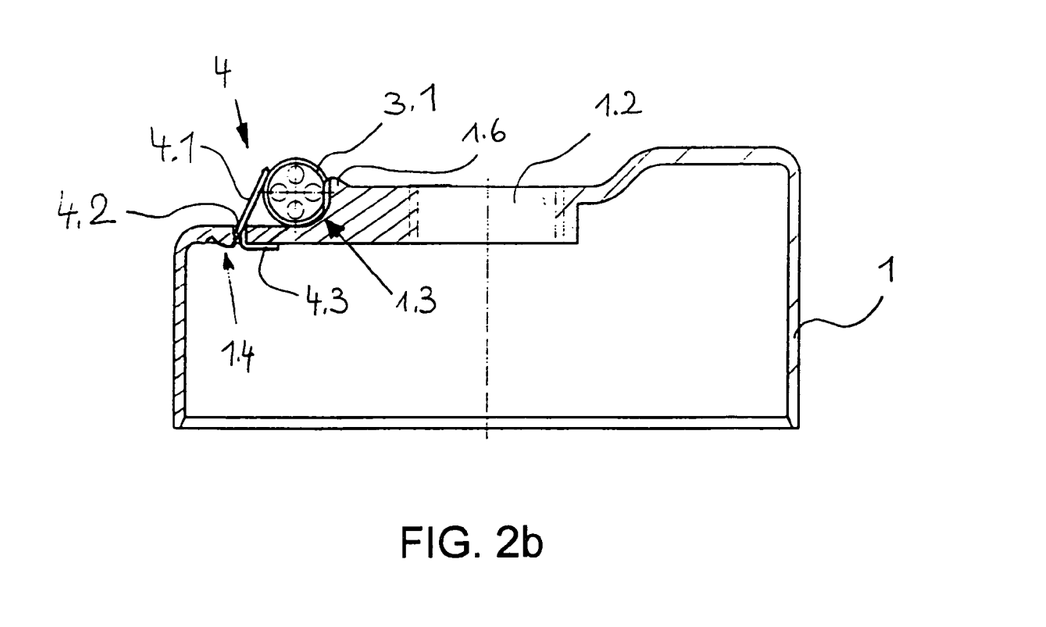
FIG. 2b is a cross-sectional view of a cap with spring-mounted connecting cable and without the opened cover, according to an exemplary embodiment.

Cap 1 of the angular position measuring device illustrated in FIG. 1 is illustrated separately in FIGS. 2a and 2b. In the following, reference is made to these Figures in addition to FIG. 1.

FIG. 2a illustrates cap 1 without mounted cover 2. At one end, connecting cable 3 has a fixation region which, in the exemplary embodiment illustrated, takes the form of an electrically conductive crimp sleeve or crimp barrel 3.1 that is in electrical connection with the shield of connecting cable 3. Projecting from crimp sleeve 3.1 are the individual conductors of connecting cable 3, which are schematically indicated by lines in FIG. 2a. A plug is located at the end of the conductors.

Cup-shaped cap 1 has a substantially hollow-cylindrical shape, one end face of the hollow cylinder being completely open. The correspondingly opposite end face, also referred to as back wall, has an off-center opening 1.1. This opening 1.1 is arranged completely outside of the center point M of the back wall, i.e., the edge of opening 1.1 does not encircle center point M. For simple connection and exchange of connecting cable 3, the conductors and the plug are guided through this opening 1.1 of cap 1, so that the plug may be inserted into a socket located on a printed-circuit board within the angular position measuring device.

For strain relief, already with cover 2 open and with the aid of a spring element 4, connecting cable 3 is anchored at its fixation region, i.e., at its crimp sleeve 3.1 on cap 1, a stop 1.6 on cap 1 permitting simple placement of crimp sleeve 3.1 on a provided contact area 1.3 of cap 1. Spring element 4 is accordingly secured on cap 1 for fixing connecting cable 3 in position with cover 2 open.

Figures 3A, 3B, 3C:
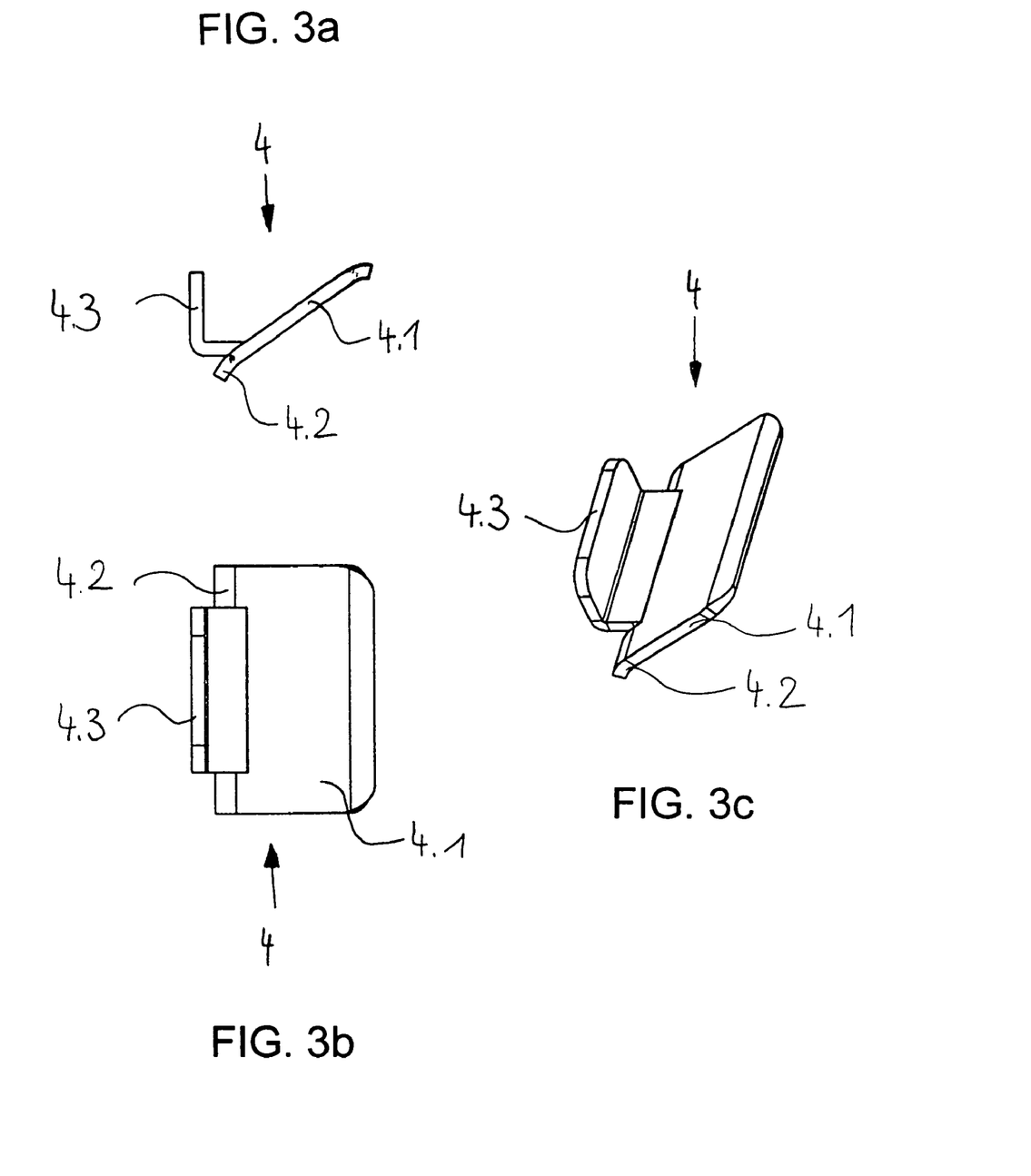
FIG. 3a is a side view of a spring element, according to an exemplary embodiment.
FIG. 3b is a top view of the spring element, according to an exemplary embodiment.
FIG. 3c is a perspective view of the spring element, according to an exemplary embodiment.

FIGS. 3a to 3c illustrate spring element 4 according to an exemplary embodiment. Spring element 4 is arranged as a one-piece sheet-metal part produced by a bending method. After the spring-steel sheet, which here is 0.5 mm thick, has been bent, a spring element 4 is obtained which includes a tongue 4.1, two retaining claws 4.2 and an angle bracket 4.3.

FIG. 2b illustrates the attachment of spring element 4 to cap 1 in detail. In the course of mounting spring element 4 on cap 1, first of all, angle bracket 4.3 of spring element 4 is guided through a slot 1.5 in cap 1, so that the two retaining claws 4.2 of spring element 4 contact, in preloaded fashion, the inner wall of slot 1.5. Thereupon, in a clamping region 1.4 of cap 1, a plastic deformation is carried out by driving in a chisel or cutting tool, so that material of cap 1 flows partially into slot 1.5. After this process, spring element 4 is anchored, free from play, on cap 1.

When crimp sleeve 3.1, i.e., connecting cable 3, is to be secured in position on cap 1, crimp sleeve 3.1 is pressed counter to the spring pressure onto contact area 1.3, so that connecting cable 3 is held by spring element 4 when crimp sleeve 3.1 touches contact area 1.3.

Thus, spring element 4 is able to generate a force that has a radial directional component with respect to connecting cable 3, connecting cable 3 being pressed against cap 1 by this force. In this manner, connecting cable 3 is secured with frictional engagement and form locking to cap 1 in a contact area 1.3 of cap 1. In this manner, a tractive force acting on connecting cable 3 outside of the angular position measuring device is not transferred to the plug-in connection.

Securing connecting cable 3 to cap 1 with form locking and frictional engagement while cover 2 is open is used, first of all, for easy assembly of the angular position measuring device, e.g., for easily producing the plug-in connection between connecting cable 3 and the printed-circuit board inside the angular position measuring device. After the plug-in connection is produced, cover 2 is fastened on cap 1. For this purpose, screw 5 is inserted through a corresponding hole in cover 2 and twisted into a central bore 1.2 in cap 1, which has an internal screw thread.

Figure 4:
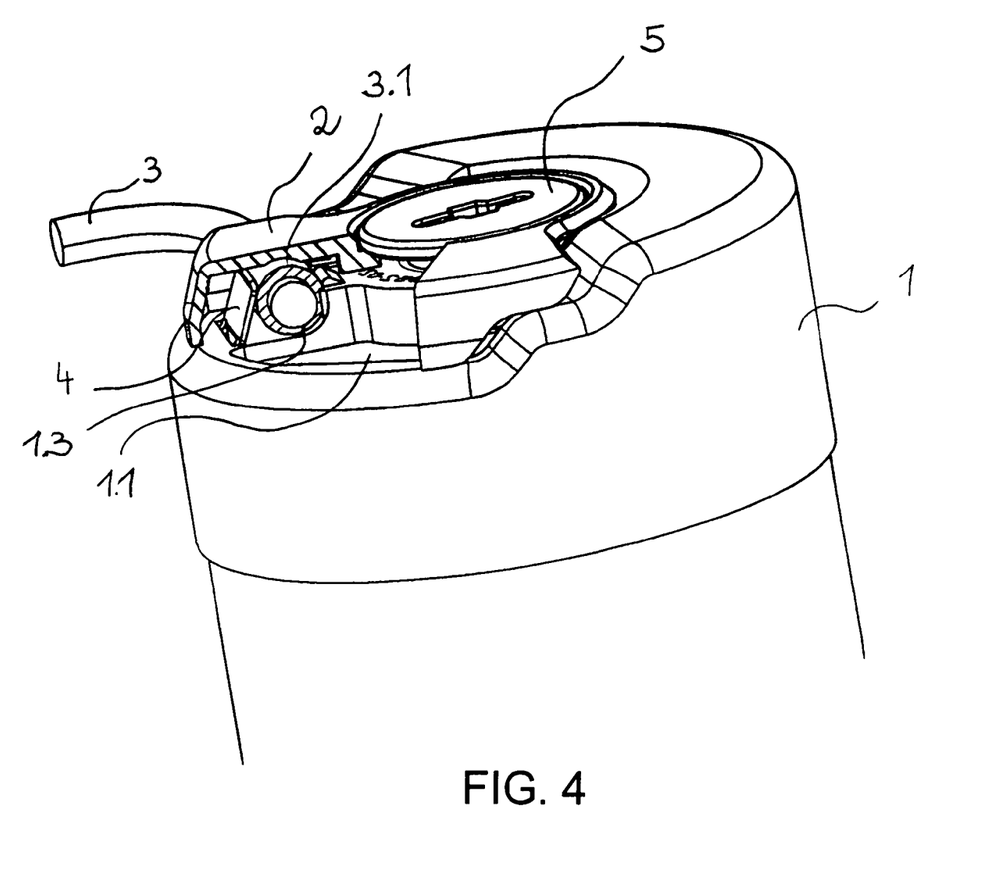
FIG. 4 is a perspective partial cross-sectional view of a cover, according to an exemplary embodiment.

FIG. 4 is a perspective partial cross-sectional view of cover 2, as it is mounted on cap 1. Cover 2 is used, inter alia, to seal opening 1.1 in cap 1. Cover 2 also encloses crimp sleeve 3.1, contact area 1.3 on cap 1 and spring element 4. The components enclosed by cover 2 are covered all-round by cover 2 at least in dust-proof fashion with respect to the surroundings, and are shielded from electromagnetic fields. To produce a tight connection between cover 2 and the back wall of cap 1, the lateral edges of cover 2 extend to the surface of the back wall and up to the side wall of cap 1.

Due to the arrangement of cover 2, a force is also introduced by closed cover 2 onto crimp sleeve 3.1, the force pressing crimp sleeve 3.1 against contact area 1.3 and thus providing an increased contact reliability of the shield connection. In other words, after cover 2 is closed, it generates a force which presses connecting cable 3 against cap 1 to further relieve strain. Permissible tractive forces for the strain relief may be increased by this measure.

As already mentioned, crimp sleeve 3.1 is electroconductive and is clamped by spring element 4 and cover 2 to reliably and easily secure it on contact area 1.3 of cap 1. Contact area 1.3 is adapted to the shape of sleeve 3.1. Crimp sleeve 3.1 thus produces an electrical connection between the shield of connecting cable 3 and cap 1 together with cover 2. Cap 1 is thereby easily connectable via connecting cable 3 to the reference potential of sequential electronics (counter, control unit). An aluminum diecasting alloy may be selected as material for cap 1, as also for cover 2, in the exemplary embodiment illustrated. Alternatively, however, it is also possible to use, for example, an electroconductive plastic or an electroconductively coated plastic, e.g., an injection-molded part.

Figures 5A, 5B, 5C:
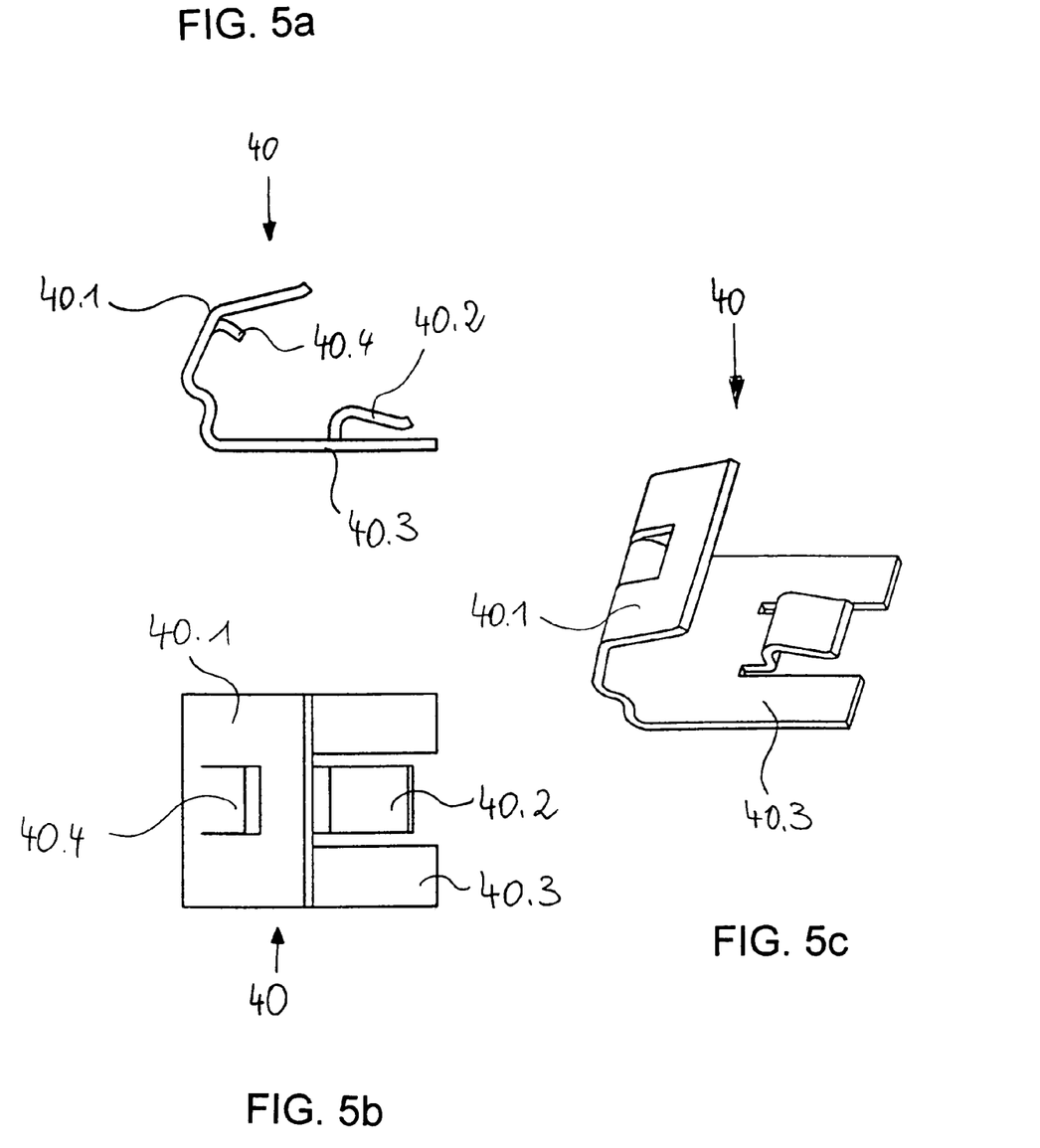
FIG. 5a is a side view of a spring element, according to an exemplary embodiment.
FIG. 5b is a top view of the spring element, according to an exemplary embodiment.
FIG. 5c is a perspective view of the spring element, according to an exemplary embodiment.

FIGS. 5a to 5c illustrate spring element 40 according to an exemplary embodiment. Spring element 40 is arranged as a one-piece sheet-metal part made of spring steel which is produced by a bending method in this example, as well. Spring element 40 includes a tongue 40.1, a retaining claw 40.2, an angle bracket 40.3 and a support segment 40.4.

Figure 6A:
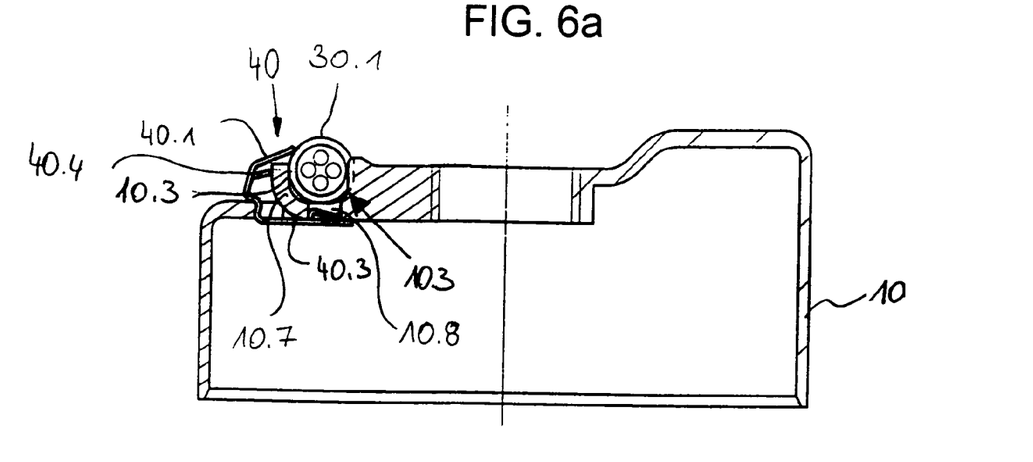
FIG. 6a is a cross-sectional view of a cap with spring-mounted connecting cable and without the opened cover, according to an exemplary embodiment.

As illustrated in FIG. 6a, another off-center opening is formed in the back wall of cap 10, in that a web 10.7 has been flanged in the back wall. This arrangement of cap 10 yields a U-shaped form for accommodating crimp sleeve 30.1. Contact area 10.3 is thereby enlarged compared to the first exemplary embodiment described above. Angle bracket 40.3 of spring element 40 is inserted through slot 10.5 for mounting spring element 40 in the second exemplary embodiment described above as well. Here, however, retaining claw 40.2 is braced against an inner wall of a further slot 10.8. This exemplary embodiment also shows that it is not absolutely necessary that opening 10.1 and slot 10.5 in the back wall of cap 10 must each be formed as separate openings. Namely, in this exemplary embodiment, a connection is present between opening 10.1 and slot 10.5. Slot 10.5 and opening 10.1 may thus also be viewed combined as one through-cut.

Due to the arrangement of spring element 40, a preloaded disposition of spring element 40 on cap 10 may be achieved, e.g., in that the spring energy of retaining claw 40.2 counteracts the spring energy of support segment 40.4.

Figure 6B:
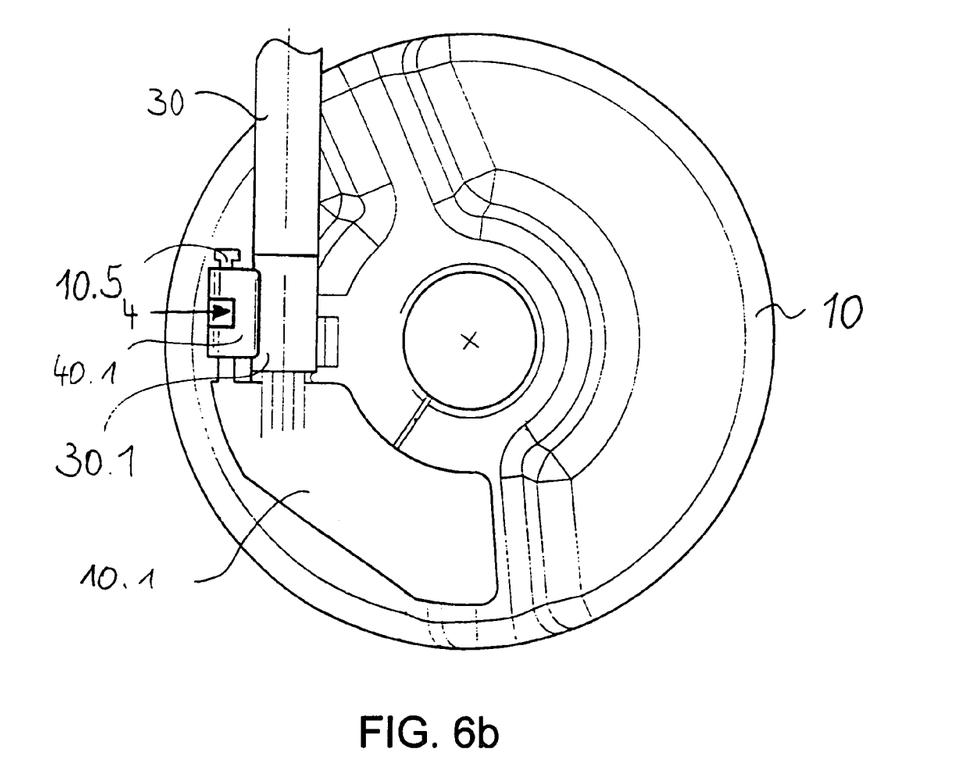
FIG. 6b is a top view of the cap without the opened cover, according to an exemplary embodiment.

FIG. 6b is a top view of cap 10 together with connecting cable 30 in an assembly phase in which cover 2 is not yet closed or mounted. In FIG. 6b, as also in FIG. 6a, it may be seen that crimp sleeve 30.1 of connecting cable 30 is pressed onto the cap by tongue 40.1 of spring element 40. Thus, if crimp sleeve 30.1 is appropriately positioned, spring element 40 generates a force, which has a radial directional component with respect to connecting cable 30, to fix connecting cable 30 in position here, as well. This force presses connecting cable 30 onto cap 10, so that connecting cable 30 is secured with form locking and frictional engagement on cap 10 in contact area 10.3 of cap 10.

After the plug-in connection is produced between the plug of connecting cable 30 and the socket on the printed-circuit board of the angular position measuring device, cover 2, which has the same functions as in the first exemplary embodiment described above, may be mounted here, as well.

Figure 7:
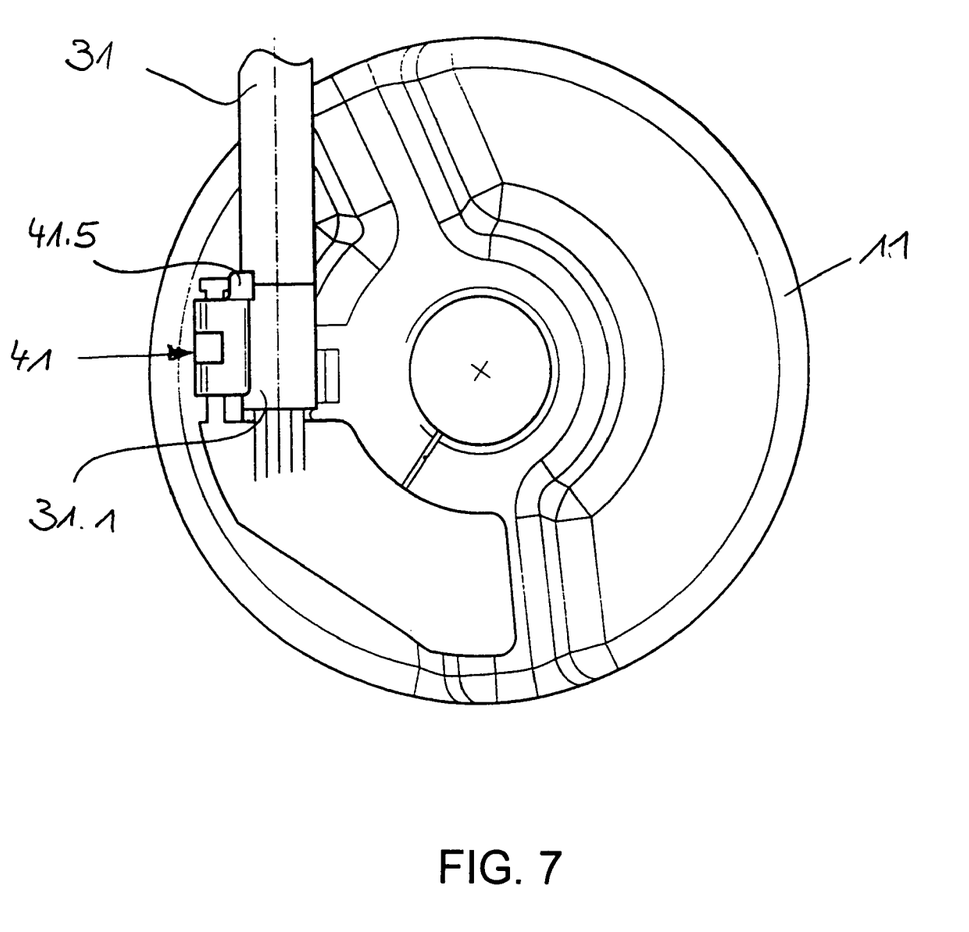
FIG. 7 is a top view of the cap without the opened cover, according to an exemplary embodiment.

FIG. 7 is a top view of cap 11 according to an exemplary embodiment, without (opened) cover 2. Spring element 41 presses crimp sleeve 31.1 of connecting cable 31 against cap 11 in this example as well. Here, however, spring element 41 has a nose 41.5 which projects beyond crimp sleeve 31.1 in the axial direction with respect to connecting cable 31. This nose 41.5 also has a projection which, in the radial direction with respect to connecting cable 31, is directed toward the middle of connecting cable 31. The spring energy of spring element 41 presses the radially directed projection into the soft outer insulation of connecting cable 31. In so doing, the projection contacts the edge of crimp sleeve 31.1. In this manner, form-locking strain relief and protection of connecting cable 31 against axial shifts is achieved by nose 41.5. Overall, therefore, connecting cable 31 is secured with form locking and frictional engagement in this example as well, after a pressure force is also generated by spring element 41 onto cap 11, from which ultimately a frictional force results.

What is claimed is:

1. An angular position measurement device, comprising:
   a cap;
   a connection cable; and
   a spring element arranged on the cap, the spring element including a tongue, the spring element configured to generate a force having a radial directional component with respect to the connection cable to press the connection cable against the cap by the tongue to fix the connection cable in position and to secure the connection cable with at least one of (a) form locking and (b) frictional engagement on the cap in a contact area of the cap.

2. The angular position measurement device according to claim 1, wherein the spring element is formed of a bent steel sheet.

3. The angular position measurement device according to claim 1, wherein the spring element is formed of a bent spring-steel sheet.

4. The angular position measurement device according to claim 1, wherein the spring element includes a one-piece construction.

5. The angular position measurement device according to claim 1, wherein the spring element includes retention claws.

6. The angular position measurement device according to claim 1, wherein the cap includes an opening, the connection cable arranged through the opening, in a closed position of a cover, the cover arranged to cover the opening, the contact area and the spring element with respect to surroundings.

7. The angular position measurement device according to claim 1, wherein the tongue includes a free end.

8. The angular position measurement device according to claim 1, wherein the tongue is elastically deformable at least in a direction of the force.

9. The angular position measurement device according to claim 1, wherein the spring element is fastened to the cap by a clamp connection.

10. The angular position measurement device according to claim 9, wherein the cap is plastically deformed in a region of the clamp connection to fasten the spring element to the cap.

11. The angular position measurement device according to claim 1, wherein the cap includes an opening, the connection cable arranged through the opening, in a closed position of a cover, the cover arranged to cover the opening and the contact area with respect to surroundings.

12. The angular position measurement device according to claim 11, wherein in the closed position of the cover, the cover is arranged to generate a force to press the connection cable against the cap to relieve strain.

13. The angular position measurement device according to claim 12, wherein the connection cable includes a fixation region, the spring element and the cover configured to generate the forces to produce the at least one of (a) the form locking and (b) the frictional engagement connection of the fixation region to the contact area of the cap.

14. An angular position measurement device, comprising:

cap means;

connecting cable means; and spring means arranged on the cap means, the spring means including tongue means, the spring means for generating a force having a radial directional component with respect to the connecting cable means for pressing the connecting cable means against the cap means by the tongue means for fixing the connecting cable means in position and for securing the connecting cable means with at least one of (a) form locking and (b) frictional engagement on the cap means in a contact area of the cap means.

15. An angular position measurement device, comprising:

a cap;

a connection cable; and a plate spring element arranged on the cap, the plate spring element configured to generate a force having a radial directional component with respect to the connection cable to press the connection cable against the cap to fix the connection cable in position and to secure the connection cable with at least one of (a) form locking and (b) frictional engagement on the cap in a contact area of the cap.

* * * * *